(12) United States Patent
Rodgers et al.

(10) Patent No.: US 10,190,522 B2
(45) Date of Patent: Jan. 29, 2019

(54) HYBRID PARTIAL AND FULL STEP QUADRATIC SOLVER FOR MODEL PREDICTIVE CONTROL OF DIESEL ENGINE AIR PATH FLOW AND METHODS OF USE

(71) Applicants: Toyota Motor Engineering & Manufacturing North America, Inc., Erlanger, KY (US); The Regents Of The University Of Michigan, Ann Arbor, MI (US)

(72) Inventors: Jason R. Rodgers, Ann Arbor, MI (US); Mike Huang, Ann Arbor, MI (US); Ilya Kolmanovsky, Novi, MI (US)

(73) Assignees: Toyota Motor Engineering & Manufacturing North America, Inc., Plano, TX (US); The Regents Of The University Of Michigan, Ann Arbor, MI (US)

(*) Notice: Subject to any disclaimer, the term of this patent is extended or adjusted under 35 U.S.C. 154(b) by 133 days.

(21) Appl. No.: 15/185,664

(22) Filed: Jun. 17, 2016

(65) Prior Publication Data
US 2017/0363032 A1 Dec. 21, 2017

(51) Int. Cl.
| F02D 41/00 | (2006.01) |
| F02D 41/28 | (2006.01) |
| F02M 26/05 | (2016.01) |
| F02D 41/14 | (2006.01) |
| F02B 37/22 | (2006.01) |

(52) U.S. Cl.
CPC ......... *F02D 41/28* (2013.01); *F02D 41/0002* (2013.01); *F02D 41/005* (2013.01);
(Continued)

(58) Field of Classification Search
CPC .. F02D 41/28; F02D 41/0005; F02D 41/0007; F02D 41/0002; F02D 41/1406;
(Continued)

(56) References Cited

U.S. PATENT DOCUMENTS

| 5,270,935 A | 12/1993 | Dudek et al. |
| 7,467,614 B2 | 12/2008 | Stewart et al. |

(Continued)

OTHER PUBLICATIONS

Schmid, Claudia, and Lorenz T. Biegler. "Quadratic programming methods for reduced hessian SQP." Computers & chemical engineering 18.9 (1994): 817-832.

(Continued)

*Primary Examiner* — David Hamaoui
(74) *Attorney, Agent, or Firm* — Dinsmore & Shohl LLP

(57) ABSTRACT

Methods and systems for use of model predictive control (MPC) controllers utilizing hybrid, quadratic solvers to solve a linear feasibility problem corresponding to a nonlinear problem for an internal combustion engine plant such as a diesel engine air path. The MPC solves a convex, quadratic cost function having optimization variables and constraints and directs the plant per the output solutions to optimize plant operation while adhering to regulations and constraints. The problem includes a combination of iterative and direct calculations in the primal space depending on whether a partial step (iterative) or a full step (direct) is attempted. Further, primal and dual space array matrices are pre-computed and stored offline and are retrieved via use of a unique identifier associated with a specific active set for a set of constraints. Such hybrid and/or offline calculations allow for a reduction in computational power while still maintaining accuracy of solution results.

10 Claims, 11 Drawing Sheets

(52) U.S. Cl.
CPC ..... *F02D 41/0005* (2013.01); *F02D 41/0007* (2013.01); *F02D 41/0077* (2013.01); *F02D 41/1401* (2013.01); *F02D 41/1406* (2013.01); *F02M 26/05* (2016.02); *F02B 37/22* (2013.01); *F02D 2041/0017* (2013.01); *F02D 2041/1412* (2013.01); *F02D 2041/1433* (2013.01); *F02D 2041/1436* (2013.01); *F02D 2041/286* (2013.01); *Y02T 10/144* (2013.01); *Y02T 10/42* (2013.01); *Y02T 10/47* (2013.01)

(58) Field of Classification Search
CPC ............... F02D 41/005; F02D 41/0077; F02D 41/1401; F02D 2041/286; F02D 2041/0017; F02D 2041/1412; F02D 2041/1433; F02D 2041/1436; F02M 26/05; F02B 37/22
See application file for complete search history.

(56) References Cited

U.S. PATENT DOCUMENTS

| | | | |
|---|---|---|---|
| 7,996,140 B2* | 8/2011 | Stewart | G05B 15/02 701/102 |
| 8,548,621 B2 | 10/2013 | Gross et al. | |
| 8,600,525 B1* | 12/2013 | Mustafa | G05B 13/048 700/1 |
| 8,766,570 B2 | 7/2014 | Geyer et al. | |
| 8,924,331 B2 | 12/2014 | Pekar et al. | |
| 9,002,615 B2 | 4/2015 | Kumar et al. | |
| 9,562,484 B2* | 2/2017 | Huang | F02D 41/1401 |
| 9,581,080 B2* | 2/2017 | Huang | F02B 47/08 |
| 9,784,198 B2* | 10/2017 | Long | F02D 41/0077 |
| 2011/0301723 A1 | 12/2011 | Pekar et al. | |
| 2014/0174413 A1 | 6/2014 | Huang et al. | |
| 2015/0275783 A1 | 10/2015 | Wong et al. | |
| 2016/0025020 A1 | 1/2016 | Hodzen et al. | |
| 2016/0076473 A1* | 3/2016 | Huang | F02D 41/1401 701/108 |
| 2016/0146134 A1 | 5/2016 | Wang et al. | |
| 2016/0160787 A1 | 6/2016 | Allain et al. | |

OTHER PUBLICATIONS

European Search Report and Opinion dated Oct. 10, 2017 filed in European Application No. 17176361.8-1603.

Forsgren Anders et al., "Primal and dual active-set methods for convex quadratic programming," Mathematical Programming, North-Holland, Amsterdam,, NL. Vo. 159, No. 1, Dec. 16, 2015, pp. 469-508.

* cited by examiner

HYBRID PARTIAL AND FULL STEP QUADRATIC SOLVER FOR MODEL PREDICTIVE CONTROL OF DIESEL ENGINE AIR PATH FLOW AND METHODS OF USE

TECHNICAL FIELD

The present specification generally relates to application of quadratic solvers to solve a linear feasibility problem corresponding to a nonlinear programming formulation and, more specifically, to application of hybrid, e.g., partial and full step, quadratic solvers to solve a linear feasibility problem corresponding to a nonlinear problem of an internal combustion engine plant (e.g., a diesel engine air path).

BACKGROUND

In internal combustion engines, an amount of air supplied to engine cylinders may be manipulated by engine components. For example, in modern diesel engines, variable geometry turbines (VGT) may be used to increase an amount of air supplied to engine cylinders by varying an angle of turbine stator inlet vanes such that the amount of supplied air is changed.

Such modern diesel engines typically balance providing optimum performance and fuel economy while meeting stringent federal regulations on emissions, such as constraints on particulate matter and nitrogen oxides. To meet these requirements, many diesel engines having a VGT also use an exhaust gas recirculation (EGR) valve having a variable controlled position. The EGR valve re-circulates varying amounts of engine exhaust gases back into the engine cylinders to allow for both a more complete combustion and reduced engine emissions.

Such engines operate over a large range of operating conditions, which may include, for example, engine speed, fuel usage, and engine load, among other conditions, and one or more controllers are embedded in an engine control unit (ECU) to control various engine actuators in response to sensors that detect engine performance. The ECU works to optimize engine performance, emissions, and other such outputs via use of, for example, quadratic solvers.

Accordingly, a need exists for alternative quadratic solvers to provide reduced computational time and an increased accuracy and methods of use of such quadratic solvers.

SUMMARY

In one embodiment, a method for controlling an internal combustion engine having a variable geometry turbine (VGT), an exhaust gas recirculation (EGR) valve, and an EGR throttle may include solving a linear quadratic problem with a predictive model comprising an updating algorithm in order to determine: (i) a requested optimized VGT lift that meets one or more constraints; and (ii) a requested optimized EGR valve flow rate that meets the one or more constraints, generating the requested optimized VGT lift responsive to an engine intake manifold pressure by controlling the VGT, and generating the requested optimized EGR valve flow rate responsive to an EGR rate by controlling the EGR valve and the EGR throttle. The solving the linear quadratic problem may include determining whether to take a determined step comprising one of a primal partial step and a primal full step at each iteration, and taking the determined step at each iteration until the linear quadratic problem is solved by the updating algorithm. Taking the primal partial step may include performing an iterative calculation, and taking the primal full step may include performing a direct calculation.

In another embodiment, a method for controlling an internal combustion engine having, within an air path of the engine, a variable geometry turbine (VGT), an exhaust gas recirculation (EGR) valve, and an EGR throttle may include formulating a constrained optimization problem for a model predictive control (MPC) controller controlling the air path based on a linear model, one or more constraints, and associated dual space and primal space matrix arrays, the linear model comprising a convex, quadratic, time-varying cost function in dual and primal space, and each array associated with a unique active set list comprising a first combination of the one or more constraints. The method may further include solving the constrained optimization problem to determine a solution, updating the constrained optimization problem with an updated active set list, repeating the solving and formulating steps until all possible active set lists of the one or more constraints are satisfied to generate a requested optimized VGT lift and a requested optimized EGR valve flow rate, each of which meets the one or more constraints, to control the air path, and implementing the solution with respect to the air path. The requested optimized VGT lift may be generated responsive to an engine intake manifold pressure by controlling the VGT, and the requested optimized EGR valve flow rate may be generated responsive to an EGR rate by controlling the EGR valve and the EGR throttle.

In yet another embodiment, a system for controlling an internal combustion engine having, within an air path of the engine, a variable geometry turbine (VGT), an exhaust gas recirculation (EGR) valve, and an EGR throttle may include a processor communicatively coupled to a non-transitory computer storage medium, wherein the non-transitory computer storage medium stores instructions that, when executed by the processor, cause the processor to formulate a constrained optimization problem for a model predictive control (MPC) controller controlling the air path based on a linear model, one or more constraints, and associated dual space and primal space matrix arrays, the linear model comprising a convex, quadratic, time-varying cost function in dual and primal space, and each array associated with a unique active set list comprising a first combination of the one or more constraints. The non-transitory computer storage medium may store further instructions that, when executed by the processor, cause the processor to solve the constrained optimization problem to determine a solution, update the constrained optimization problem with an updated active set list, repeat the solving and formulating steps until all possible active set lists of the one or more constraints are satisfied to generate a requested optimized VGT lift and a requested optimized EGR valve flow rate, each of which meets the one or more constraints, to control the air path, and implement the solution with respect to the air path. The requested optimized VGT lift may be generated responsive to an engine intake manifold pressure by controlling the VGT, and the requested optimized EGR valve flow rate may be generated responsive to an EGR rate by controlling the EGR valve and the EGR throttle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Referring generally to the figures, embodiments of the present disclosure are directed to use of MPC controllers utilizing hybrid, e.g., partial and full step, quadratic solvers to solve a linear feasibility problem corresponding to a nonlinear problem for an internal combustion engine plant (e.g., the plant being a diesel engine air path) that has engine operating parameters as constraints. Generally, the MPC methods described herein solve a convex, quadratic cost function having optimization variables and constraints and direct operation of the plant per output solutions to optimize plant operation while adhering to regulations and constraints. The problem is time-varying, though is solvable as a discrete time invariant model, and can include a combination of iterative and direct calculations in the primal space depending on whether a partial step (utilizing the iterative calculation) or a full step (utilizing the direct calculation) is attempted. Further, primal and dual space array matrices are pre-computed, stored offline, and are retrieved via use of a unique identifier associated with a specific active set for a set of constraints, as will be described in greater detail further below. Such hybrid and/or offline calculations allow for a reduction in computational power while still maintaining accuracy of solution results for implementation by the plant.

Various embodiments of the diesel engine air path plant and MPC operations and methods for use of such plant operations via MPC controllers are described in detail herein. It should be understood that the algorithms described herein may be applied to plants other than diesel engine air paths as will be apparent to those of ordinary skill in the art.

Figure 1:
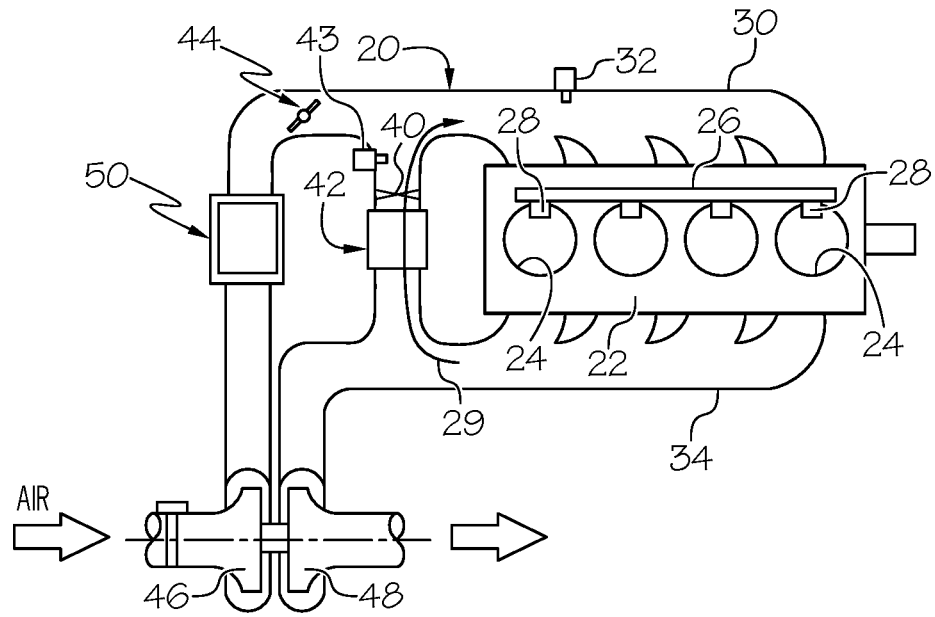
FIG. 1 is a schematic illustration of a diesel engine controlled by a model predictive controller, according to one or more embodiments shown and described herein.

FIG. 1 depicts an internal combustion engine 20, which is, as a non-limiting example, a diesel engine. The engine 20 includes an engine block 22 that houses a plurality of cylinders 24. A fuel rail 26 is connected to a fuel supply (not shown) and supplies diesel fuel to a plurality of fuel injectors 28, and each cylinder 24 is provided with a fuel injector 28.

An intake manifold 30 is coupled to the plurality of cylinders 24 to supply intake air to each cylinder 24. Also coupled to the intake manifold 30 is an intake manifold pressure sensor 32 to measure intake manifold air pressure. Combustion gases are carried away from the plurality of cylinders 24 and the engine block 22 by an exhaust manifold 34.

A bypass path 29 between the intake manifold 30 and the exhaust manifold 34 has a coupled EGR valve 40 to re-circulate a portion of the exhaust gases from the exhaust manifold 34 back into the intake manifold 30 for supply to the plurality of cylinders 24. Along with the EGR valve 40, an EGR cooler 42 may be coupled in the bypass path 29. As described above, the EGR valve re-circulates varying amounts of engine exhaust gases back into the engine cylinders to allow for both a more complete combustion and reduced engine emissions. The amount the EGR valve 40 is opened controls an amount of engine exhaust gases which are able to re-circulate through the bypass path 29 from the exhaust manifold 34 back into the intake manifold 30. The EGR cooler 42 assists to help prevent the EGR valve 40 from overheating, which may otherwise lead to an increased wear and tear.

An EGR throttle 44 to further assist with controlling gas circulation is mounted in an airflow path from a compressor 46 of a VGT 48. An intercooler 50 to assist with preventing overheating of the EGR throttle 44 may be mounted ahead of the EGR throttle 44 in the airflow path for intake air. The compressor 46 increases a pressure of the incoming air. Further, the VGT 48 includes turbine input vanes that may be opened, partially opened, or closed through an angling of the turbine input vanes to control a VGT lift and to allow for the passage of air in through the EGR throttle 44 to join with the exhaust gases being re-circulated into the intake manifold 30 through the bypass path 29. Thus, by controlling an angle of turbine input vanes, the VGT 48 controls an intake manifold pressure provided by the compressor 46 of the VGT 48. An amount the EGR throttle 44 is opened also restricts the amount of air provided through the VGT 48 that is able to join with air recirculated through the bypass path 29. Also coupled to walls defining the bypass path 29 is an EGR rate sensor 43 to measure EGR rate (such as a fraction of re-circulated air versus fresh air) as it is affected by the EGR valve 40 and/or the EGR throttle 44. Another measurement, EGR flow rate or EGR flow, may refer to an amount of mass re-circulated air flow through the EGR valve 40.

Figure 2:
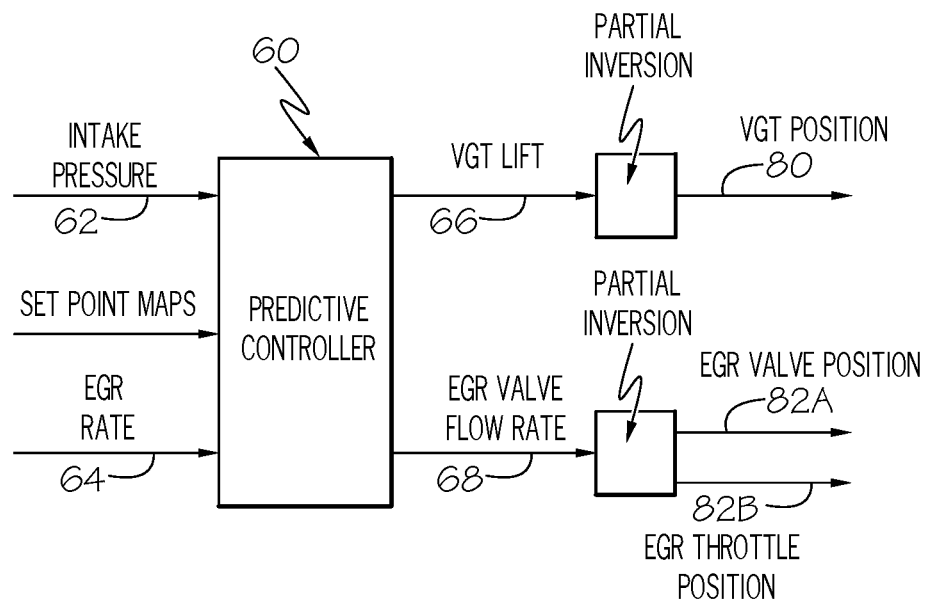
FIG. 2 is a schematic block diagram showing inputs and outputs to the model predictive controller, according to one or more embodiments shown and described herein.

In embodiments described herein, a model predictive controller utilizing a MPC for the engine 20 uses a plurality of control inputs. The control inputs may be, for example, and as shown in FIG. 2, an intake manifold pressure 62 measured or calculated from signals generated by the intake manifold pressure sensor 32 and/or an EGR rate 64 measured or calculated from signals generated by the EGR rate sensor 43. One or more set point maps may prescribe set-points for the control inputs such as intake pressure and EGR rate. Further, Kalman filter estimates based on measurements of control inputs such as intake pressure, ECU estimated EGR rate, and mass airflow (MAF) may be used.

Figure 3:
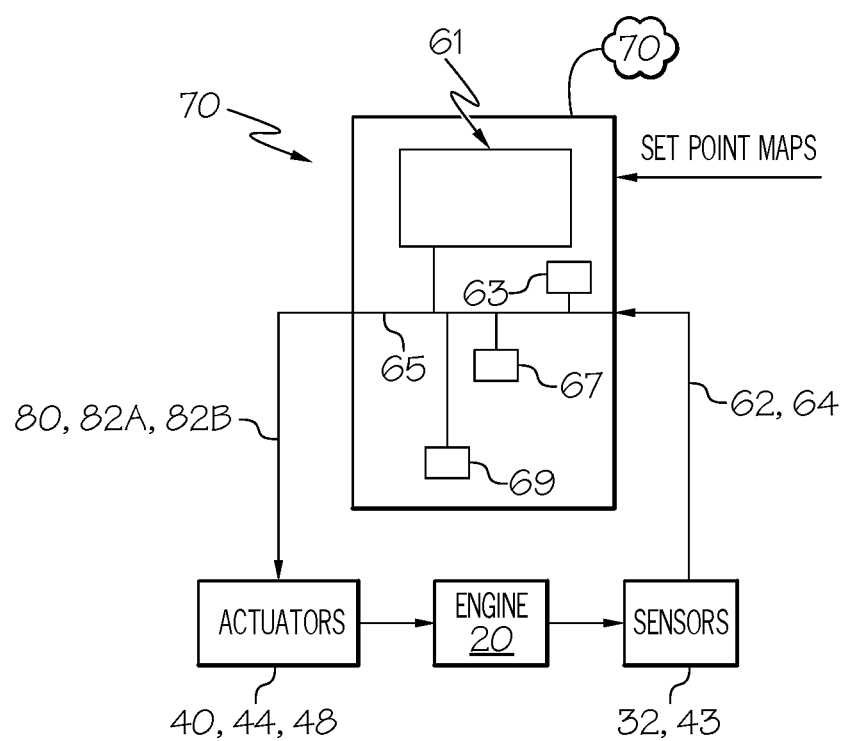
FIG. 3 is a schematic block diagram of the engine of FIG. 1 using the model predictive controller of FIG. 2, according to one or more embodiments shown and described herein.

In the MPC controller methods described herein, and as described in greater detail further below, a single solution is solved for a convex problem based on dual and primal space arrays, which may be pre-computed and stored offline. As a system that is utilized for the MPC controller methods described herein, FIG. 3 shows an ECU 70, which controls the plant (e.g., the diesel engine air path) of FIGS. 1-2. The ECU 70 includes a processor 61 that may execute a computer program that is tangibly embodied on a computer usable medium and includes instructions that are executable by the processor to direct the MPC controller as described below. The ECU 70 may including a central processing unit (CPU) that is any type of device or devices capable of manipulating or processing information. The CPU may be practiced with a single or multiple processors.

The ECU 70 may be communicatively coupled to the actuators (e.g., to actuate the EGR valve 40, the EGR throttle 44, and/or the VGT 48), engine 20, and sensors (e.g., the intake manifold pressure sensor 32 and/or the EGR rate sensor 43) as shown in FIG. 3 through a communication path 65, for example. The communication path 65 may be formed from any medium that is capable of transmitting a signal such as, for example, conductive wires, conductive traces, optical waveguides, or the like, or from a combination of mediums capable of transmitting signals. The communication path 65 communicatively couples the various components of the engine 20 and the ECU 70. As used herein, the term "communicatively coupled" means that coupled components are capable of exchanging data signals with one another such as, for example, electrical signals via conductive medium, electromagnetic signals via air, optical signals via optical waveguides, and the like.

As noted above, the ECU 70 may include one or more processors 61 that can be any device capable of executing machine readable instructions. Accordingly, a processor 61 may be a controller, an integrated circuit, a microchip, a computer, or any other computing device. The processor 61 is communicatively coupled to the other components of FIG. 3 by the communication path 65. Accordingly, the communication path 65 may communicatively couple any number of processors 61 with one another, and allow the modules coupled to the communication path to operate in a distributed computing environment. Specifically, each of the modules can operate as a node that may send and/or receive data.

The ECU 70 also includes a memory component 63, which is coupled to the communication path 65 and communicatively coupled to the processor 61. The memory component 63 may be a non-transitory computer readable medium and may be configured as a nonvolatile computer readable medium. The memory component 63 may comprise RAM, ROM, flash memories, hard drives, or any device capable of storing machine readable instructions such that the machine readable instructions can be accessed and executed by the processor 61. The machine readable instructions may comprise logic or algorithm(s) written in any programming language such as, for example, machine language that may be directly executed by the processor, or assembly language, object-oriented programming (OOP), scripting languages, microcode, etc., that may be compiled or assembled into machine readable instructions and stored on the memory component. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The ECU 70 further includes additional storage or databases 67 to store components such as off-line pre-computed matrices, as described in greater detail further below. The memory component 63 may include machine readable instructions that, when executed by the processor 61, cause the process 61 to perform the functions of the ECU 70, operating as an MPC controller.

The ECU 70 includes the network interface hardware 69 for communicatively coupling the ECU 70 with a computer network 71. The network interface hardware 69 is coupled to the communication path 65 such that the communication path 65 communicatively couples the network interface hardware 69 to other modules of the ECU 70. The network interface hardware 69 can be any device capable of transmitting and/or receiving data via a wireless network. Accordingly, the network interface hardware 69 can include a communication transceiver for sending and/or receiving data according to any wireless communication standard. For example, the network interface hardware can include a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

The quadratic programming (QP) solver as described herein utilizes, in a first embodiment, a QPKWIK algorithm with a derivation as set forth herein for controlling a plant of a diesel engine air path. Utilizing the QPKWIK algorithm for controlling a diesel engine air path plant allows for finding an MPC solution for large scale process optimization problems that include many variables and time-varying constraints but only a few degrees of freedom, which helps reduce computational time. The optimization variables as time varying control inputs may be, for example, a VGT lift 66 and a EGR valve flow rate 68. Time varying linear terms or variables may be, for example, control inputs such as an intake manifold pressure 62 and/or an EGR rate 64. The QPKWIK algorithm uniquely only requires that an inverse Cholesky factor of a Hessian matrix to be supplied, which inverse Cholesky factor is obtained at each iteration directly using a factorized inverse BFGS formula (e.g., a quasi-Newton update formula). A resulting quadratic program sub-problem has a resulting solution having degrees of freedom of the second order rather than a third order, requiring less computational time than a higher order problem, for example.

Below is a derivation of the QPKWIK algorithm.

The following convex quadratic problem serves as a convex function to solve by the ECU 70 while satisfying the associated problem constraints:

$$\min_u J(u) = \frac{1}{2} u^T Q u + \mathcal{H}^T u \quad \text{(Equation 3.1)}$$
$$\text{s.t. } \mathcal{V} u \leq \mathcal{W}$$
$$u_L \leq u \leq u_U$$

At each time step k, $\mathcal{H}$ is a linear term in the cost function (time varying); $Q$ is a quadratic term in the cost function (constant); $\mathcal{V}$ is a constraint matrix (constant); $\mathcal{W}$ is a constraint vector (time varying); and $u$ is one or more optimization variables (e.g., time varying control inputs). Assumptions are made that $J$ is convex and that the constraints are linear. Equation 3.1 can be simplified by taking into account only active (feasible) constraints to the following:

$$\min_u J(u) = \frac{1}{2} u^T Q u + \mathcal{H}^T u \quad \text{(Equation 3.2)}$$
$$\text{s.t. } \mathcal{V} u \leq \mathcal{W}$$

Active constraints indicate those constraints that are possible and plays a part in finding an optimal solution such that the inequality active constraint holds as an equality constraint, as described in greater detail further below. Using, for optimality, Karush-Kuhn-Tucker (KKT) conditions, which must hold for a solution to be a minimum, and a vector of Lagrange multipliers, the convex problem and constraints are combined to form the following Lagrangian:

$$\mathcal{L} = \frac{1}{2} u^T Q u + \mathcal{H} u - \mu^T (\mathcal{V} u - \mathcal{W}) \quad \text{(Equation 3.3)}$$

Taking partial derivatives of Equation 3.3 and setting them equal to zero, optimal values for $u^*$ and $\mu^*$ are obtained as follows and as set forth in Equation 3.4 as a dual problem having two sets of equations to satisfy:

$$\frac{d\mathcal{L}}{du} = Q u^* - \mathcal{V} \mu^* + \mathcal{H} = 0 \quad \text{(Equation 3.4)}$$
$$\frac{d\mathcal{L}}{d\mu} = -\mathcal{V}^T \mu^* + \mathcal{W} = 0$$

Further, for the dual problem to have dual feasibility, all of the Lagrange multipliers $\mu$ must be greater than or equal to zero. Those that are equal to zero are inactive constraints, those that are greater than zero are active constraints playing a role in the solution, and those that are less than zero indicate the problem is infeasible and should be investigated. If the optimal value for $u^*$ satisfies Equation 3.4 above and the Lagrange multipliers $\mu$ are zero for all inactive constraints, then the dual cost function $\mathcal{L}(u, \mu)$ is equal to the primal cost function $J(u)$ and a complementary slackness condition is upheld such that the solution to the dual problem is the same as the solution to the primal problem.

Thus, if there are no active constraints, then Equation 3.4 returns the unconstrained minimum (e.g., the global minimum) of the convex problem. Equation 3.4 can be written into matrix form, as shown in Equation 3.5 below:

$$\begin{bmatrix} Q & -\mathcal{V} \\ -\mathcal{V}^T & 0 \end{bmatrix} \begin{bmatrix} u^* \\ \mu^* \end{bmatrix} = -\begin{bmatrix} \mathcal{H} \\ \mathcal{W} \end{bmatrix} \quad \text{(Equation 3.5)}$$

Equation 3.5 then is able to become Equation 3.6, which is the solution for the optimization variable(s) $u^*$ and Lagrangian multiplier(s) $\mu^*$ as set forth below:

$$\begin{bmatrix} u^* \\ \mu^* \end{bmatrix} = \begin{bmatrix} -H & D \\ D^T & U \end{bmatrix} \begin{bmatrix} \mathcal{H} \\ \mathcal{W} \end{bmatrix} \quad \text{(Equation 3.6)}$$

where, as set forth in Equation 3.7 below, $$H = Q^{-1} - Q^{-1} \mathcal{V} (\mathcal{V}^T Q^{-1} \mathcal{V})^{-1} \mathcal{V}^T Q^{-1}$$
$$D = Q^{-1} \mathcal{V} (\mathcal{V}^T Q^{-1} \mathcal{V})^{-1}$$
$$U = -(\mathcal{V}^T Q^{-1} \mathcal{V})^{-1} \quad \text{(Equation 3.7)}.$$

As $Q^{-1} \mathcal{V}$ is repeated many times, Equation 3.7 may be simplified by using (1) a Cholesky decomposition to make $Q^{-1}$ easily invertible and by using (2) QR factorization to allow for inverting a non-square matrix. With respect to the Cholesky decomposition, for a positive definite matrix such as $Q$, the matrix can be decomposed into two triangular matrices L using the following rule:

$$Q = L L^T \quad \text{(Equation 3.8)}$$

Using Cholesky decomposition on $Q^{-1} \mathcal{V}$ results in the following Equation 3.9:

$$Q^{-1} \mathcal{V} = L L^{T-1} \mathcal{V} = L^{-T} L^{-1} \mathcal{V} \quad \text{(Equation 3.9)}$$

Using QR factorization, which is a decomposition that allows a n×m matrix N to be decomposed into an orthogonal matrix and an upper triangular matrix R, the following rule can be used:

$$N = \hat{Q} \begin{bmatrix} R \\ 0 \end{bmatrix} = [\hat{Q}_1 \ \hat{Q}_2] \begin{bmatrix} R \\ 0 \end{bmatrix} = \hat{Q}_1 R + \hat{Q}_2 0 = \hat{Q}_1 R \quad \text{(Equation 3.10)}$$

Applying the QR factorization of Equation 3.10 to Equation 3.9 results in the following:

$$Q^{-1} \mathcal{V} = \quad \text{(Equation 3.11)}$$
$$L^{-T} [\hat{Q}_1 \ \hat{Q}_2] \begin{bmatrix} R \\ 0 \end{bmatrix} = [L^{-T} \hat{Q}_1 \ L^{-T} \hat{Q}_2] \begin{bmatrix} R \\ 0 \end{bmatrix} = [T^C \ T^U] \begin{bmatrix} R \\ 0 \end{bmatrix}$$

where $$T^C = L^{-T} \hat{Q}_1 \quad \text{(Equation 3.12)}$$
$$T^U = L^{-T} \hat{Q}_2$$

Combining Equations 3.7 and 3.11 lead to matrices, as set forth below, that are used to the solve the KKT condition and are redefined as follows:

$$H = T^U(T^U)^T$$

$$D = T^C R^{-T}$$

$$U = -(R^{-1}R^T)^{-1} \quad \text{(Equation 3.13)}$$

Thus, applying Equation 3.13 to Equation 3.6, the solution to the problem is given as follows:

$$u = -T^U(T^U)^T \mathcal{H} + T^C R^{-T} \mathcal{W}$$

$$\mu^* = R^{-1}(T^C)^T \mathcal{H} + R^{-1}R^{-T} \mathcal{W} \quad \text{(Equation 3.14A)}$$

Because the algorithm solves the KKT problem based on a current active set (denoted as subscript L below), Equation 3.14A can be rewritten as Equation 3.14B below:

$$u_L = -T_L^U(T_L^U)^T \mathcal{H} + T_L^C R_L^{-T} \mathcal{W}_L$$

$$\mu_L = R_L^{-1}(T_L^C)^T \mathcal{H} + R_L^{-1}R_L^{-T} \mathcal{W}_L \quad \text{(Equation 3.14B)}$$

As solving the above problem may be computationally costly to do for each iteration, the algorithm may be simplified further and may calculate how to move from an active set L to a new active set L+1, as follows:

$$u_{L+1} = u_L + T_L^U(T_L^U)^T v_{knext} t$$

$$\mu_{L+1} = \mu_L - R_L^{-1}(T_L^C)^T v_{knext} t \quad \text{(Equation 3.15)}$$

In the above Equation 3.15, t is a minimum length the algorithm can take and still maintain dual feasibility (and is calculated in both primal and dual spaces), and $v_{knext}$ is the next constraint to be added to a current constraint set list. Additionally, where z is an array that is indicative of a search direction in primal space, and r is an array that is indicative of a search direction in dual space, the following may be used:

$$z = T_L^U(T_L^U)^T$$

$$r = R_L^{-1}(T_L^C)^T \quad \text{(Equation 3.16)}$$

The final QPKWIK equations may then be, in primal and dual space respectively, simplified to the following:

$$u_{L+1} = u_L + z v_{knext} t$$

$$\mu_{L+1} = \mu_L - r v_{knext} t \quad \text{(Equation 3.17)}$$

A minimum value of t (which is calculated for both dual space and primal space) is chosen to ensure the solution stays within a feasible region.

In a second embodiment, and as described herein, an HQPKWIK algorithm is utilized as a quadratic solver for model predictive control (MPC) of diesel engine air path flow. The HQPKWIK algorithm uses a hybrid model that differs from the QPKWIK algorithm, as will be described in greater detail below. First, the HQPKWIK algorithm utilizes pre-computed primal and dual space arrays that are computed offline (and a lookup algorithm to retrieve the necessary arrays), whereas the QPKWIK algorithm calculates such arrays online such that the iterative, online calculations (as shown by the derivation below) utilize more computational power and read-only memory (ROM) than the HQPKWIK algorithm.

For example, to determine which matrix to extract from a set of pre-computed arrays, the current set list L is converted to an identifier using the following pseudo-code as a lookup algorithm:

```
for i = 1 ... l
    if L_i>0
        identifier = sum(identifier) + 2^{l-i}
    end
end
return identifier
```

Once a unique identifier is determined for a given set list L, a pair of z and r (primal and dual space) matrices relating to the set list and associated with the unique identifier may be retrieved. As a non-limiting example, for a given problem with 5 constraints such that l=5, a current active set list L may have active constraints 1, 3, and 5 such that L={1,0,3, 0,5}. Using the lookup algorithm, the identifier is able to be determined as follows:

$$\text{identifier} = 2^{5-1} + 2^{5-3} + 2^{5-5} = 2^4 + 2^2 + 2^0 = 16 + 4 + 1 = 21$$

Thus, the unique identifier is determined to be a decimal number 21 from a summation of converted binary numbers to result in a decimal value, and the primal z and dual r space matrices corresponding to this unique identifier may be retrieved. Alternatively, as set forth further below in Example 2, if a constraint is active, it is able to be assigned a value of 1 from which a binary number may be determined and converted to a decimal number to find an associated unique identifier.

Second, the HQPKWIK algorithm modifies the updating QPKWIK algorithm to improve numerical solutions by incorporating a partial and full step hybrid model utilizing both iterative and direct next step calculation approaches for the primal space. The QPKWIK algorithm, by contrast, utilizes iterative next step calculations for the primal space that may result at times in out of bound errors and infeasible solutions.

For example, in the QPKWIK algorithm, only iterative computations in primal space are used (as shown by use of $v_{knext}$) through the following primal space solution from Equation 3.15:

$$u_{L+1} = u_L + T_L^U(T_L^U)^T v_{knext} t \quad \text{Primal Full Step}$$

This may result in a computational expense plus possible errors for full step solutions that are greater than an acceptable error of 1e-6 and are outside of the boundaries for a feasible solution. Thus, the hybrid QPKWIK solution, or HQPKWIK, allows for partial steps (also referable to as half steps, though not necessarily having to be exact half portions of a full step) to be taken rather than a full primal step. For example, the partial steps involve iterative calculations (see Equation 3.15) and the primal full step involves direct calculations (as shown by Equation 3.14B) in which the equation is solved directly and doesn't assume where the step is going to be. Thus, Equation 3.15 for primal space is modified for the HQPKWIK algorithm to be as follows:

$$u_{L+1} = \begin{cases} u_L + T_L^U(T_L^U)^T v_{knext} \, t & \text{Primal Partial (Half) Step} \\ -T_{L+1}^U(T_{L+1}^U)^T \mathcal{H} + \\ T_{L+1}^C R_{L+1}^{-T} \mathcal{W}_{L+1} & \text{Primal Full Step} \end{cases} \quad \text{(Equation 3.18A)}$$

$$\mu_{L+1} = \mu_L - R_L^{-1}(T_L^C)^T v_{knext} \, t \quad \text{Dual Step}$$

Using the definitions of primal and dual space matrices z and r, respectively, this simplifies to the following equation:

$$\mathcal{U}_{L+1} = \quad \text{(Equation 3.18B)}$$

$$\begin{cases} \mathcal{U}_L + zv_{knext} \, t & \text{Primal Partial (Half) Step} \\ -T^U_{L+1}(T^U_{L+1})^T \mathcal{H} + \\ T^C_{L+1} R^{-T}_{L+1} \mathcal{W}_{L+1} & \text{Primal Full Step} \end{cases}$$

$$\mu_{L+1} = \mu_L - rv_{knext} \, t \quad \text{Dual Step}$$

Which is further able to be simplified to the following:

$$\mathcal{U}_{L+1} = \quad \text{(Equation 3.18 C)}$$

$$\begin{cases} \mathcal{U}_L + zv_{knext} \, t & \text{Primal Partial (Half) Step} \\ -z\mathcal{H} + r^T \mathcal{W}_{L+1} & \text{Primal Full Step} \end{cases}$$

$$\mu_{L+1} = \mu_L - rv_{knext} \, t \quad \text{Dual Step}$$

Figure 4:
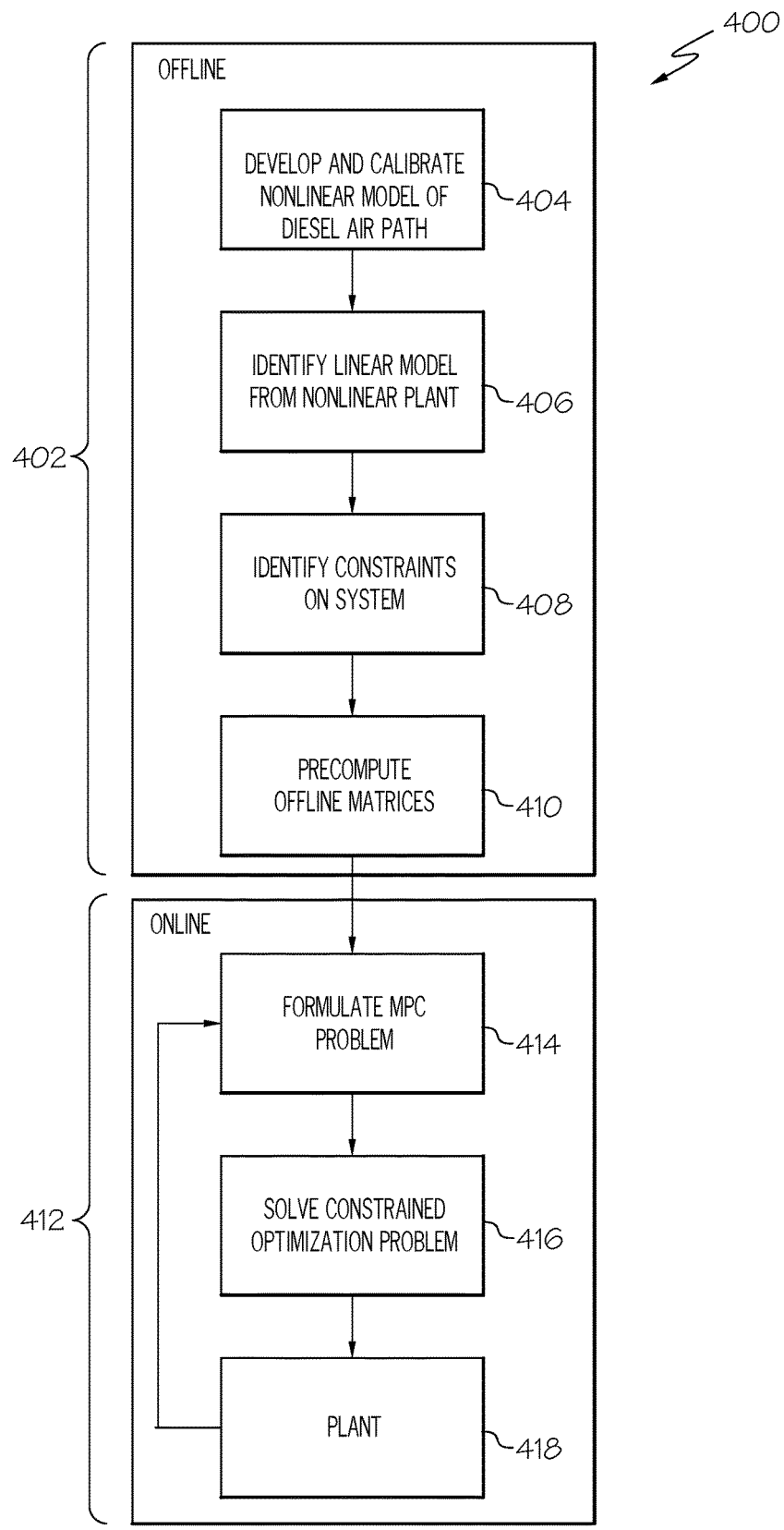
FIG. 4 is an illustration of a flow diagram depicting offline and online sequence steps and operations of a model predictive control method, according to one or more embodiments shown and described herein.
Figure 5:
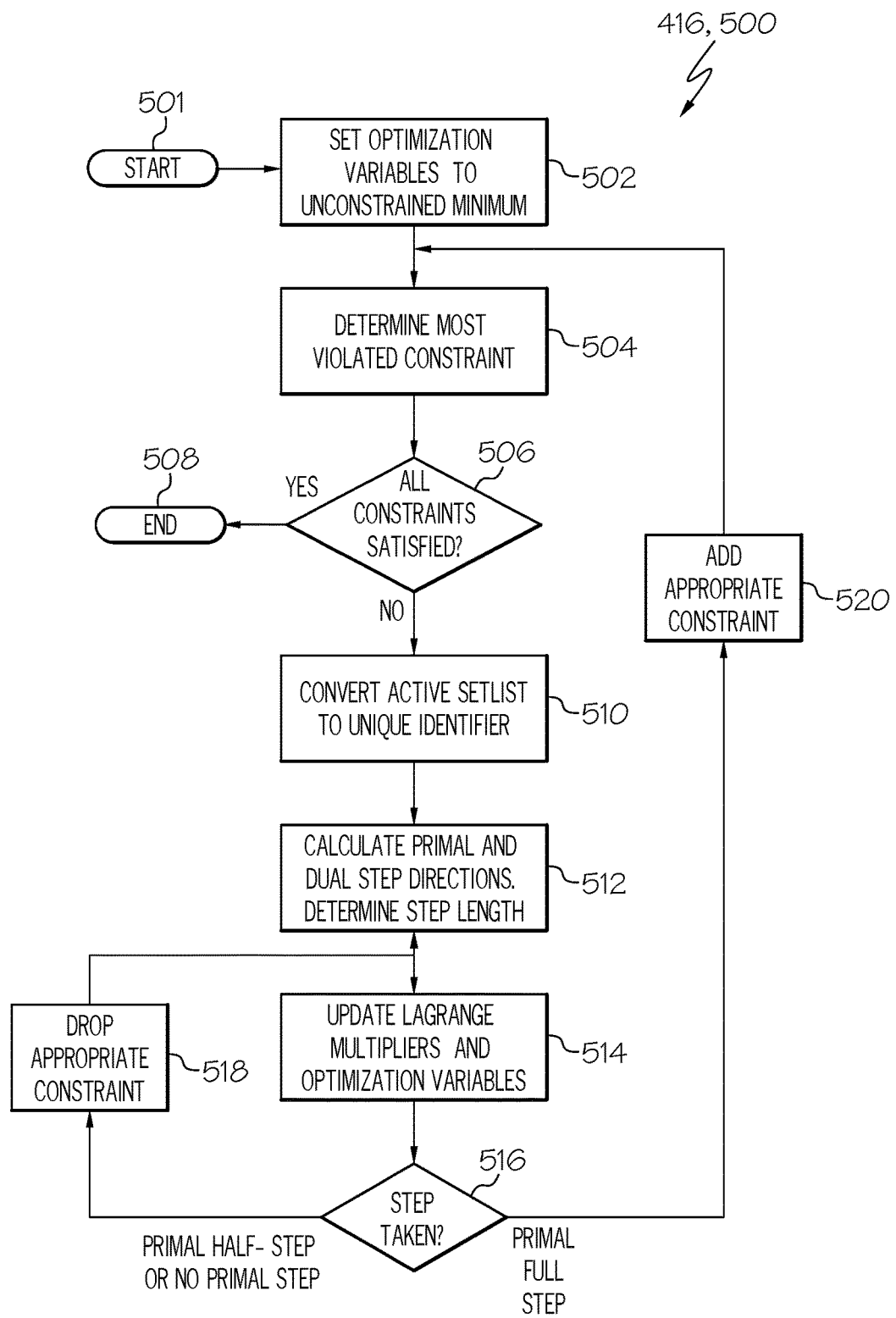
FIG. 5 is an illustration of a flow diagram of a hybrid quadratic solver algorithm applied with respect to the model predictive control method of FIG. 4, according to one or more embodiments shown and described herein.

FIG. 4 illustrates a flow chart of an operation 400 of an MPC model utilizing the offline and online aspects of the HQPKWIK algorithm, and FIG. 5 illustrates the specific HQPKWIK algorithm that is involved in a solving a constrained optimization problem of step 416 of the flow chart of FIG. 4.

Referring to FIG. 4, the operation 400 of the MPC model utilizing the HQPKWIK algorithm has an offline portion 402 including steps 404-410. In step 404, the operation 400 develops and calibrates a nonlinear model of a diesel air path of the engine 20. For example, inputs may include VGT position (e.g., the VGT position 80 of FIGS. 2-3) and EGT valve angle (e.g., the EGR valve position 82A of FIGS. 2-3), and outputs may respectively include exhaust/intake pressure 62 and EGT rate 64 of FIGS. 2-3, as well as MAF. The inputs and outputs may be generalized and not necessarily restricted to being rate-based, and a derivative operations to inputs and outputs are thus not required for generalized, non-rate based inputs and outputs.

In step 406, the nonlinear plant is linearized around an operating point such that a linear model is identified from the nonlinear plant. In step 408, constraints on the system are identified, examples of which may include but are not limited to a maximum MAF overshoot, a maximum EGR rate, a maximum/minimum EGR valve command (such as a valve open command) indicating an engine operating range, a maximum/minimum VGT lift closed command, and/or a maximum/minimum EGR flow command. In step 410, offline matrices in the dual and primal search direction are pre-computed and stored. These matrices are used to solve a sub-problem created by using the various combinations of constraints that follow the HQPKWIK algorithm, as described in greater detail below, and by applying the equations of the HQPKWIK algorithm that stem from the QPKWIK derivation as described above.

The operation 400 of the MPC model utilizing the HQPKWIK algorithm further has an online portion 412 that includes steps 414-418. In step 414, the MPC problem (e.g., Equation 3.2) is formulated. Example inputs are current constraints, observer estimates, sensor inputs, targets, and the like. Example outputs are matrices that define the optimization problem.

In step 416, the MPC/constrained optimization problem is solved and a desired control is output. For example, and by application of the HQPKWIK algorithm, Equation 3.2 is solved for a current optimization problem. The HQPKWIK algorithm applied in this step 416 is described in greater detail with respect to FIG. 5 below. Referring again to FIG. 4, in step 418, the desired control outputs are provided to the plant of the diesel air path such that the VGT and EGR valves are controlled via the solution provided in step 416. The operation 400 loops back to the step 414 to repeat the steps 414-418 to solve and implement solutions for new, ongoing, and next optimization problem sets.

Referring to FIG. 5, the HQPKWIK algorithm as reference 500 is applied to solve the MPC/constrained optimization problem of step 416. The HQPKWIK algorithm 500 starts at step 501 and continues on to set the optimization variables to an unconstrained minimum (e.g., a global minimum $\mathcal{U}^*_0$) at step 502.

For example, the global minimum for the convex quadratic function of $$J(\mathcal{U}) = \frac{1}{2} \mathcal{U}^T \mathcal{Q} \mathcal{U} + \mathcal{H}^T \mathcal{U}$$

is found by using the gradient, as follows:

$$\nabla J(\uparrow^*) = 0 \Rightarrow \mathcal{Q} \mathcal{U}^* + \mathcal{H} = 0 \Rightarrow \mathcal{U}^* = -\mathcal{Q}^{-1} \mathcal{H}$$

For example, below is an example problem and solution to minimize a quadratic cost function $J(\mathcal{U})$ having two optimization variables $\mathcal{U}_{01}$ and $\mathcal{U}_{02}$:

Problem:

$$\min_{\mathcal{U}} J(\mathcal{U}) [\mathcal{U}_{01} \ \mathcal{U}_{02}] \begin{bmatrix} 1 & 0 \\ 0 & 1 \end{bmatrix} \begin{bmatrix} \mathcal{U}_{01} \\ \mathcal{U}_{02} \end{bmatrix} + [1 \ 1] \begin{bmatrix} \mathcal{U}_{01} \\ \mathcal{U}_{02} \end{bmatrix}$$

Solution $$\nabla J(\mathcal{U}^*) = -\mathcal{Q}^{-1} \mathcal{H} = -\begin{bmatrix} 1 & 0 \\ 0 & 1 \end{bmatrix}^{-1} \begin{bmatrix} 1 \\ 1 \end{bmatrix} \Rightarrow \mathcal{U}^* = \begin{bmatrix} \mathcal{U}^*_{01} \\ \mathcal{U}^*_{02} \end{bmatrix} = \begin{bmatrix} -1 \\ -1 \end{bmatrix}$$

Figure 6A:
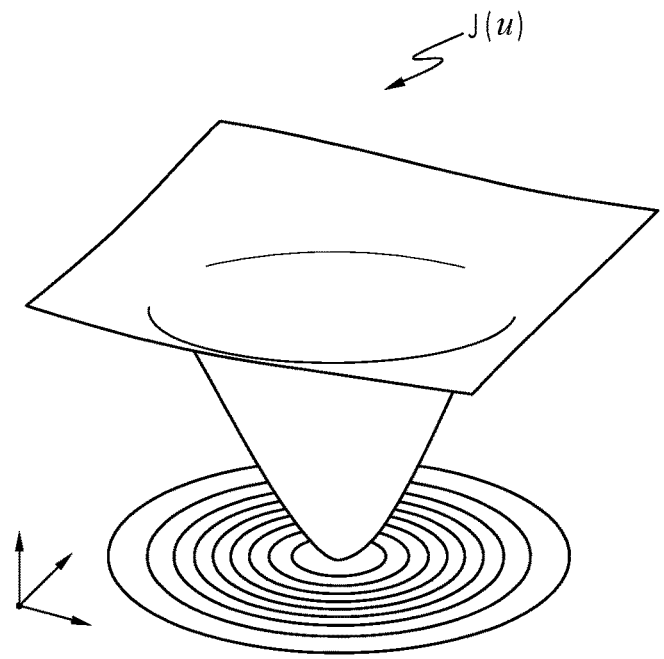
FIG. 6A is a graphical illustration of a convex cost function problem in a three-dimensional primal space, according to one or more embodiments shown and described herein.
Figure 6B:
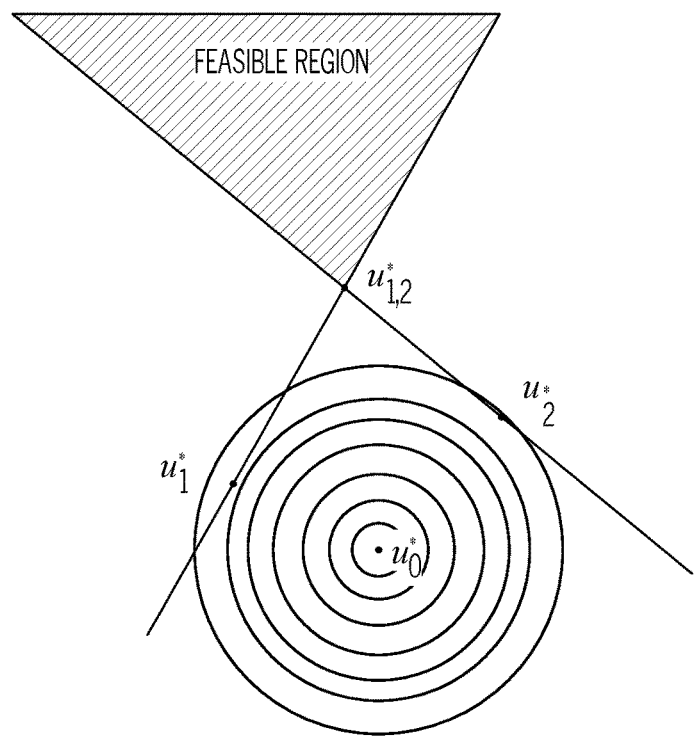
FIG. 6B is a graphical illustration of the convex cost function problem of FIG. 6A in a two-dimensional primal space and having a primal feasible region, according to one or more embodiments shown and described herein.

FIG. 6A shows an example of a graphical representation of the convex quadratic function $J(\mathcal{U})$ in a three-dimensional primal space, and FIG. 6B shows a graphical representation of the convex quadratic function in a primal space including the global minimum $\mathcal{U}^*_0$ (which is the minimum, bottom-most point of the three-dimensional convex cost function of FIG. 6A). FIG. 6B further shows, as will be described in greater detail further below, an active (possible) set list L={1,2} having two (active) constraints. FIG. 6B shows a first iteration $\mathcal{U}^*_1$ along constraint 1, a second iteration $\mathcal{U}^*_2$ along constraint 2, and a point $\mathcal{U}_{1,2}$ when a set list L={1,2} is an active, possible one. The region above point $\mathcal{U}^*_{1,2}$ and contained by the set list L={1,2} is the primal feasible region, and point $\mathcal{U}^*_{1,2}$ is a minimum feasible solution which may be found via the HQPKWIK algorithm 500 as described in greater detail below. Primal feasibility as described herein refers to whether a point lies within a region that satisfies all constraints (and is termed the "primal feasible region"). If the point does lie within the primal feasible region, then the point is feasible, and if it does not, then it is infeasible.

Further, with respect to active constraints versus inactive constraints as described herein, if an inequality constraint is considered active, then the inequality constraint (e.g., $h_i(\mathcal{U}) = \mathcal{V}_i \mathcal{U} + \mathcal{W}_i \leq 0$) plays a part in finding the optimal solution $u^*$ and holds as an equality constraint, e.g., $h_i(u)=0$. However, while a constraint may be inactive (as the optimal point does not lie on an intersection stemming from the constraint), it may still create a feasible region on which the optimal point $u^*$ lies.

Referring again to FIG. 5, after the unconstrained (global) minimum $u^*_0$ is found in step 502, as described above, the most violated (possible) constraint is determined in step 504. In step 506, if all the possible constraints are satisfied, the algorithm exits at step 508 to proceed onto the plant (e.g., diesel air path) implementation in step 418 of FIG. 4 with the solution that includes the desired control outputs. If, however, all the possible constraints are not satisfied in step 506, the algorithm continues on to step 508 to convert an active set list to a unique identifier with respect to a lookup algorithm, as described above, for example. Once the unique identifier is obtained, then the identifier is able to be used to locate specific pre-computed dual and primal space arrays (r and z, respectively, of Equations 3.16-3.17) to be used in step 512 to calculate primal and dual step directions and determine step length. In step 514, the Lagrange multipliers and the optimization variables are updated. In step 516, the algorithm determines what type of step is to be taken.

For example, a primal full step is taken for feasible step directions that are within an error boundary and satisfy dual feasibility. As a result of this step, an appropriate constraint is added in step 520 and the algorithm returns to step 504 to determine the next most violated constraint and to repeat the steps as described above.

A primal partial step (otherwise referable to as half step, though not necessarily having to be 50% of a full step but simply a portion of the full step) may need to be taken, however, if a primal full step would otherwise not satisfy dual feasibility. A primal no step (e.g., no primal step) is taken when the maximum number of constraints that may be active at one time is met and, thus, a constraint needs to be dropped to continue on to the next problem to be solved. For example, if the step 516 determines a primal half or full step is to be taken, the appropriate constraint is dropped in step 518 to return to the same previous problem and the Lagrange multipliers and optimization variables in step 514 are updated accordingly without the dropped constraint in step 514. The algorithm repeats until all possible constraints are satisfied in step 506 such that the algorithm proceeds to step 508 to exit with the desired control outputs as a minimum feasible solution to provide to the plant in step 418 of the operation 400 of FIG. 4.

Thus, in embodiments, and referring to FIGS. 1-5, a method for controlling the internal combustion engine 20 of FIG. 1 that has the VGT 48, the EGR valve 40, and the EGR throttle 44 includes solving a linear quadratic problem as describe herein with a predictive model that includes an updating algorithm to determine (i) a requested optimized engine turbine (VGT) lift 66 that meets one or more active constraints, and (ii) a requested optimized EGR valve flow rate 68 that meets the one or more active constraints. Solving the linear quadratic problem includes determining, at each iteration, whether to take a determined step that is a primal partial step or a primal full step, and taking the determined step at each iteration until the linear quadratic problem is solved by the updating algorithm. Taking the primal partial step includes performing an iterative calculation, and taking the primal full step includes performing a direct calculation.

Referring to FIGS. 1-3, the method further includes generating the requested optimized engine turbine lift 66 by controlling the VGT 48 responsive to engine intake manifold pressure 62 (e.g., as measured by the intake manifold pressure sensor 32). For example, through control of the VGT position 80 (e.g., corresponding to an angling of the turbine input vanes) by actuators, the actuators thus control the VGT 48 and affect the engine intake manifold pressure 62. Additionally, the method includes generating the requested optimized EGR valve flow rate 68 by controlling the EGR valve 40 and the EGR throttle 44 responsive to the EGR rate 64 (e.g., as measured by the EGR rate sensor 43). For example, through respective control of the EGR valve position 82A and the EGR throttle position 82B by respective actuators, the actuators thus respectively control the EGR valve 40 and the EGR throttle 44 and affect the EGR rate 64.

EXAMPLES

Example 1

Figure 7A:
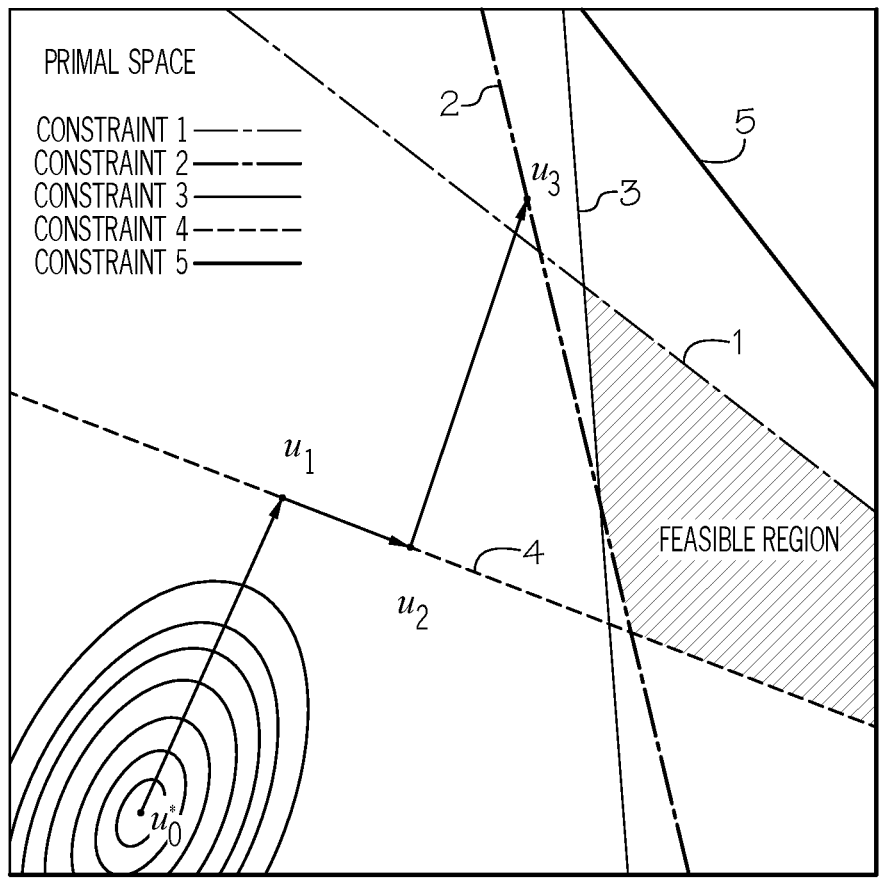
FIG. 7A is a graphical illustration of a first set of iterations in a primal space in an example of a solution to the convex problem of FIG. 6A that utilizes the flow diagram of FIG. 5, according to one or more embodiments shown and described herein.
Figure 7B:
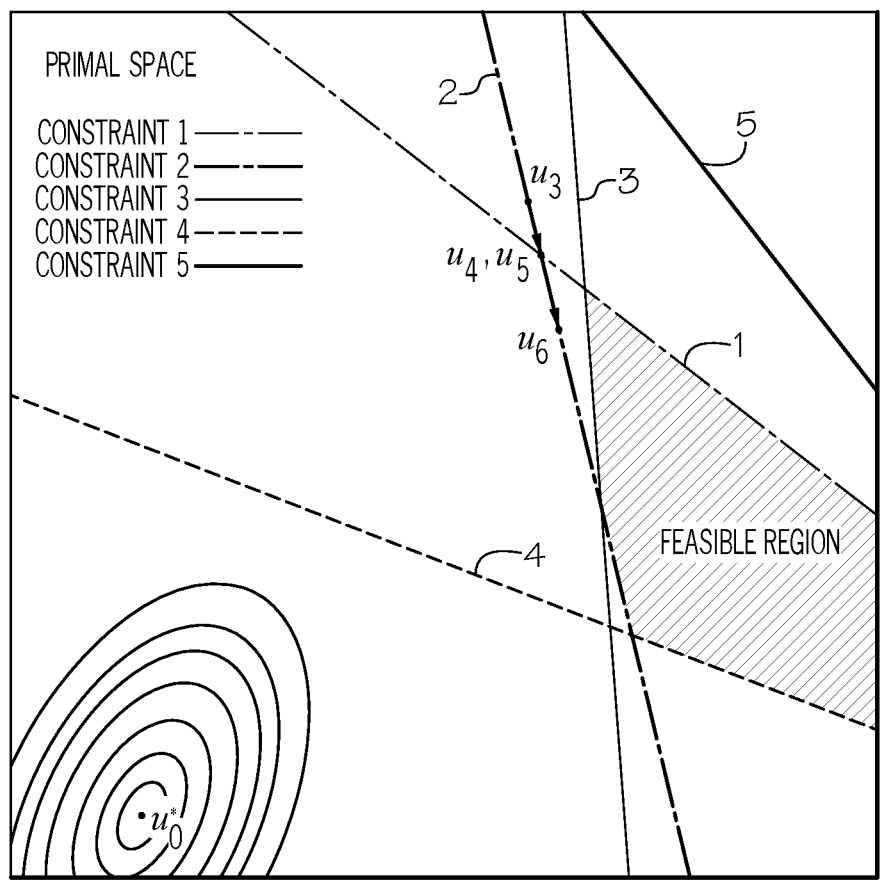
FIG. 7B is a graphical illustration of a second set of iterations in the primal space following the first set of iterations of FIG. 7A, according to one or more embodiments shown and described herein.
Figure 7C:
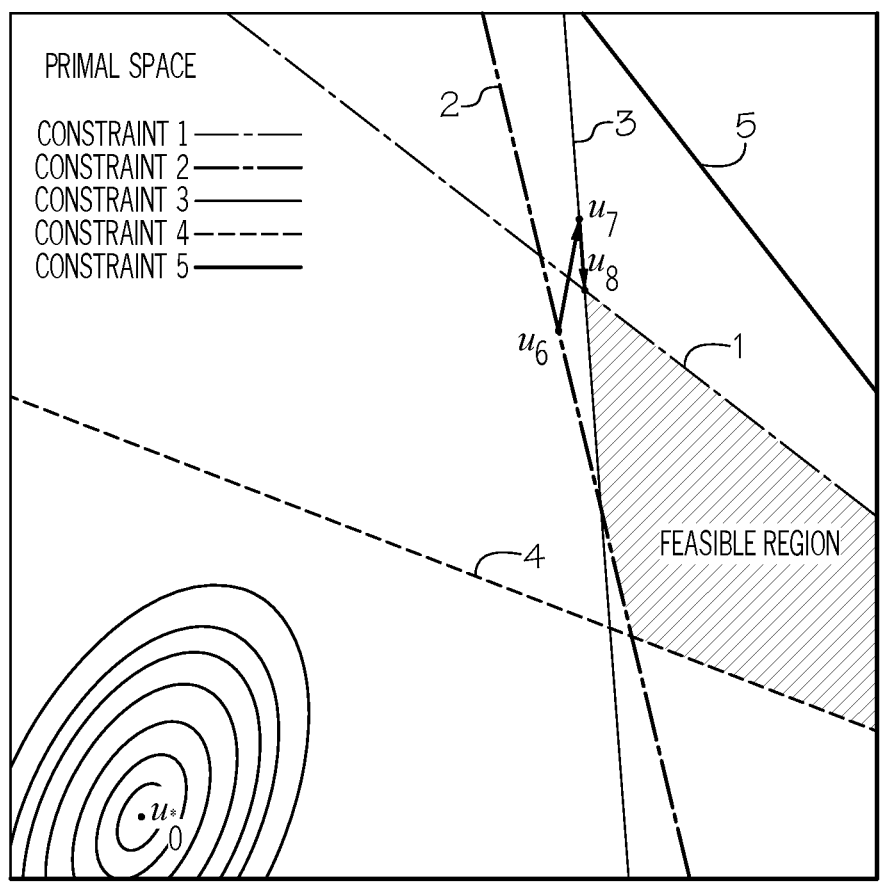
FIG. 7C is a graphical illustration of a third set of iterations in the primal space following the second set of iterations of FIG. 7B, according to one or more embodiments shown and described herein.

FIGS. 7A-7C show an example, along with Table 1 below, of an application of the HQPKWIK algorithm of FIG. 5.

TABLE 1

| Iteration ($u_i$) | Possible Constraint to Add | Max. Step Length for Dual Feasibility | Max Primal Step Length | Min. Length | Possible Constraint to Drop | Active Set List | Primal Step Taken |
|---|---|---|---|---|---|---|---|
| 0 ($u_0$) | 4 | ∞ | 0.15 | 0.15 | — | [0 0 0 4 0] | Full Step (Add 4) |
| 1 ($u_1$) | 2 | 0.46 | 1.88 | 0.46 | 4 | [0 0 0 0 0] | Half Step (Drop 4) |
| 2 ($u_2$) | 2 | ∞ | 0.36 | 0.36 | — | [0 2 0 0 0] | Full Step (Add 2) |
| 3 ($u_3$) | 1 | ∞ | 0.084 | 0.084 | — | [1 2 0 0 0] | Full Step (Add 1) |
| 4 ($u_4$) | 3 | 0.81 | ∞ | 0.81 | 1 | [0 2 0 0 0] | No Step (Drop 1) |
| 5 ($u_5$) | 3 | 0.14 | 0.94 | 0.14 | 2 | [0 0 0 0 0] | Half Step (Drop 2) |

TABLE 1-continued

| Iteration ($u_i$) | Possible Constraint to Add | Max. Step Length for Dual Feasibility | Max Primal Step Length | Min. Length | Possible Constraint to Drop | Active Set List | Primal Step Taken |
|---|---|---|---|---|---|---|---|
| 6 ($u_6$) | 3 | ∞ | 0.01 | 0.01 | — | $\begin{bmatrix} 0 \\ 0 \\ 3 \\ 0 \\ 0 \end{bmatrix}$ | Full Step (Add 3) |
| 7 ($u_7$) | 1 | ∞ | 0.003 | 0.003 | — | $\begin{bmatrix} 1 \\ 0 \\ 3 \\ 0 \\ 0 \end{bmatrix}$ | Full Step (Add 1) |
| 8 ($u_8$) | — | — | — | — | — | — | — |

The system of the example of FIGS. 7A-7C includes two (2) optimization variables and five (5) constraints. The examples solves for the quadratic problem of Equation 3.2 and includes the following term(s), matrices(s), and vector(s):

$$Q = \begin{bmatrix} .8814 & -.155 \\ -.155 & .0679 \end{bmatrix}$$

$$\mathcal{H} = \begin{bmatrix} .8109 \\ -.0834 \end{bmatrix}$$

$$\mathcal{V} = \begin{bmatrix} -.7157 & -.6985 \\ .9916 & .1291 \\ .9977 & .0673 \\ .3863 & .9224 \\ -.866 & -.4636 \end{bmatrix}$$

$$\mathcal{W} = \begin{bmatrix} -3.623 \\ 1.431 \\ 1.202 \\ 1.839 \\ -4.1753 \end{bmatrix}$$

After the unconstrained (global) minimum $u^*_0$ is found in step 502 (as shown at iteration 0 as $u_0$ in Table 1), the example determines the most violated possible constraint in step 504. In the example of FIGS. 7A-7C, the possible constraints would be Constraints 1-4 as they border a feasible region. Constraint 5 would not be possible, and thus would be an inactive constraint. Further, each of the Constraints 1-5 may include a single optimization variable as a constraint or multiple constraining optimization variables. For example, Constraint 1 may include a temperature constraint, a pressure constraint, or a combination of a temperature or pressure constraints. Constraints may include limits such as maximum levels, minimum levels, or operating range restrictions, for example.

As shown in the first data row of Table 1, the most violated possible constraint would be Constraint 4. After determining that all possible constraints are thus not satisfied in step 506, the algorithm continues on to steps 510-514 to solve for a maximum step length for dual feasibility. This is found to be a maximum primal step length, as shown in the first data row, third and fourth columns, respectively, of Table 1. If the minimum length is the maximum primal step length, as found here, the algorithm continues on to take a primal step and to add the evaluated constraint (i.e., Constraint 4) to an active set list, as shown in Table 1, and thus follows steps 516 and 520 to return to step 504.

At iteration 1, where the system is now at point $u_1$ along a boundary represented by Constraint 4, the algorithm determines in step 504 that the next most violated possible constraint is now Constraint 2 (as shown in the second data row of Table 1). As steps 510-514 are applied to Constraint 2, however, the maximum step length for dual feasibility is found to be less than the maximum primal step length. This indicates that the full primal step would be out of an error boundary zone and infeasible with both Constraints 2 and 4, and thus Constraint 4 needs to be dropped. A half (e.g., partial) step is then taken at step 516 to point $u_2$, Constraint 4 is dropped in step 518, and the Lagrange multipliers and optimization variables are updated at step 514 for the previous same problem without Constraint 4. In iteration 2 (with the algorithm now starting at point $u_2$), Constraint 2 is again evaluated (this time without Constraint 4) and the Lagrange multipliers and optimization variables are updated at step 514. At step 516, the maximum primal step length and the maximum step length for dual feasibility are compared, and the maximum primal step length is found to be the minimum length. Thus, step 516 determines that a full (primal) step should be taken and that Constraint 2 should be added to the active set list to arrive at point $u_3$. The algorithm continues through iterations 3 through 8 until all possible constraints are satisfied at step 506.

More particularly, at iteration 4 when the algorithm is at point $u_4$ and attempts to add Constraint 3, a determination is made at step 516 that no step should be taken as a maximum number of constraints are active at one time. Thus, the algorithm updates to point $u_5$ that is the same as point $u_4$, and Constraint 1 is dropped. In iteration 5, however, it is determined at step 516 to take a half step to point $u_6$, and Constraint 2 is dropped from the active set list. At iteration 6, it is determined at step 516 that a full step may be taken to add Constraint 3 in step 520. In iteration 7, Constraint 1 is added in a full step moving the algorithm from point $u_7$, to point $u_8$, which is a most minimum point of the feasible region that satisfies all possible restraints and is an output solution for the plant (e.g., utilized in step 418 of FIG. 4).

Example 2

Figure 8A:
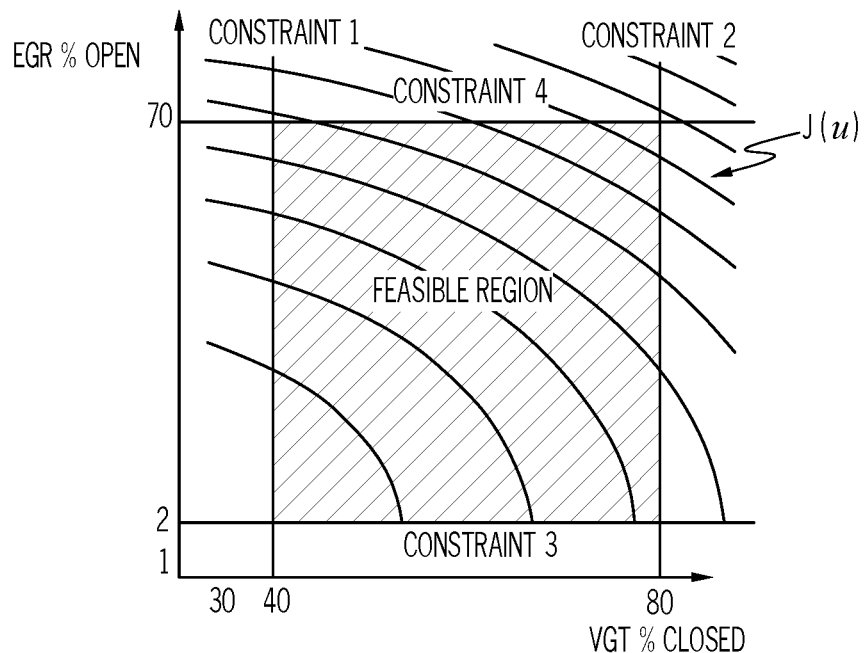
FIG. 8A is a graphical illustration of another primal space example of a solution to the convex problem of FIG. 6A, which includes a primal problem having four constraints and two optimization variables, according to one or more embodiments shown and described herein.
Figure 8B:
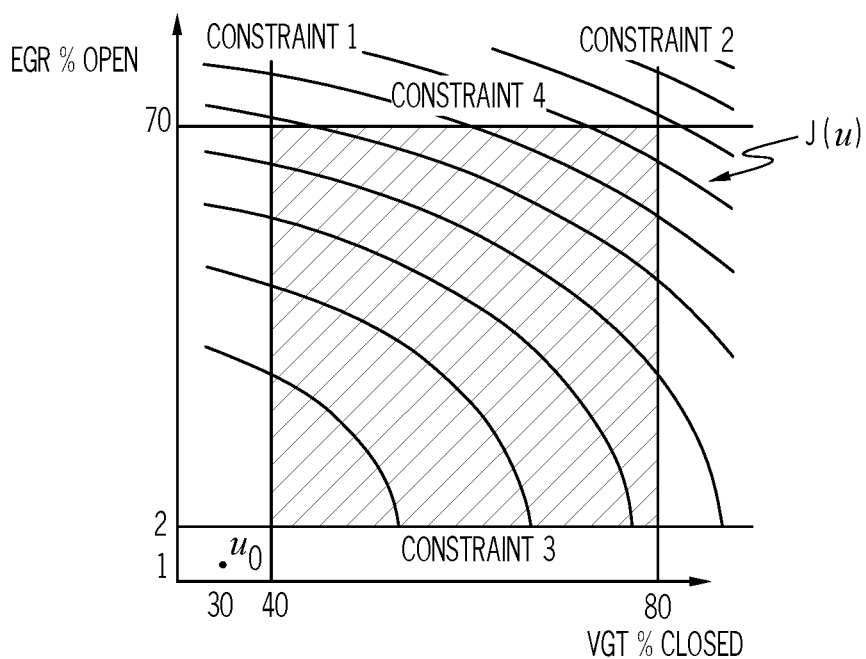
FIG. 8B is a graphical illustration of a first step in solving the primal problem of FIG. 8A, according to one or more embodiments shown and described herein.

Referring to FIGS. 8A-8B, another example is presented with respect to use of the algorithm of FIG. 5. FIG. 8A shows a graphical representation of the primal problem having two (2) optimization variables and four (4) constraints. For example, for a given $Q$ and $\mathcal{H}$ as set forth below, the problem involves an optimal value of a VGT position $u^*_1$ (units of % closed) and an EGR valve opening $u^*_2$ (units of % open) that minimizes the quadratic cost function $J(u)$ and satisfies the following four constraints of Table 2:

TABLE 2

| Constraint Number | Description | Mathematical Representation |
|---|---|---|
| 1 | Minimum VGT % Closed = 40% | $h_1(u) = -u_1 + 40 \leq 0$ |
| 2 | Maximum VGT % Closed = 80% | $h_2(u) = u_1 - 80 \leq 0$ |
| 3 | Minimum EGR Valve Opening = 2% | $h_3(u) = -u_2 + 2 \leq 0$ |
| 4 | Maximum EGR Valve Opening = 70% | $h_4(u) = u_2 - 70 \leq 0$ |

In particular, the associated primal problem is:

$$\min_{u} J(u) = \left(\frac{1}{2}u\right)^T Qu + \mathcal{H}^T u$$

$$\text{s.t. } h(u) = \mathcal{V} u \mathcal{W} \leq 0$$

where $u = \begin{bmatrix} u_1 \\ u_2 \end{bmatrix}$, $Q = \begin{bmatrix} 10.7 & 0 \\ 0 & 26 \end{bmatrix}$, $\mathcal{H} = \begin{bmatrix} -321 \\ -26 \end{bmatrix}$, $$\mathcal{V} = \begin{bmatrix} -1 & 0 \\ 1 & 0 \\ 0 & -1 \\ 0 & 1 \end{bmatrix}, \text{ and } \mathcal{W} = \begin{bmatrix} 40 \\ -80 \\ 2 \\ -70 \end{bmatrix}.$$

The HQPKWIK algorithm 500 first starts at step 501 and then sets the optimization variables to an unconstrained minimum at step 502 such that, as shown in FIG. 8B, $$u_0 = -Q^{-1}\mathcal{H} = \begin{bmatrix} 30 \\ 1 \end{bmatrix}.$$

At step 504, the most violated constraint is determined to be Constraint 1, as $\max(\mathcal{V} u_0 - \mathcal{W} > 0) =$ Constraint 1. In step 506, the algorithm 500 determines that not all the possible constraints are satisfied (as it had identified Constraint 1 as a most violated possible constraint in step 504), and the algorithm 500 proceeds to step 510, in which the active set list is converted to a unique identifier. In the present example, the active set list is of the form S={Constraint 4, Constraint 3, Constraint 2, Constraint 1} such that $S_1=\{0, 0,0,1\} \Rightarrow 0001_{bin}=1_{dec}$. The algorithm 500 then proceeds to step 512 to calculate primal and dual step direction and determine step length, which it does to find that a full primal step should be taken and Constraint 1 added as $t=\min(10, \infty)=10$ (primal space) $\Rightarrow$ Full Primal Step. The algorithm 500 proceeds to step 514 to update the optimization variables $u_1$ and the Lagrange multipliers $\mu_1$ as follows:

$$u_1 = -z_{1dec}\mathcal{H} + r_{1dec}^T \mathcal{W}_1 = \begin{bmatrix} 40 \\ 1 \end{bmatrix}$$

$$\mu_1 = 0 - \begin{bmatrix} -r_{1dec}^T v_1 \\ 1 \end{bmatrix} t = \begin{bmatrix} 10 \\ 0 \end{bmatrix}.$$

Figure 8C:
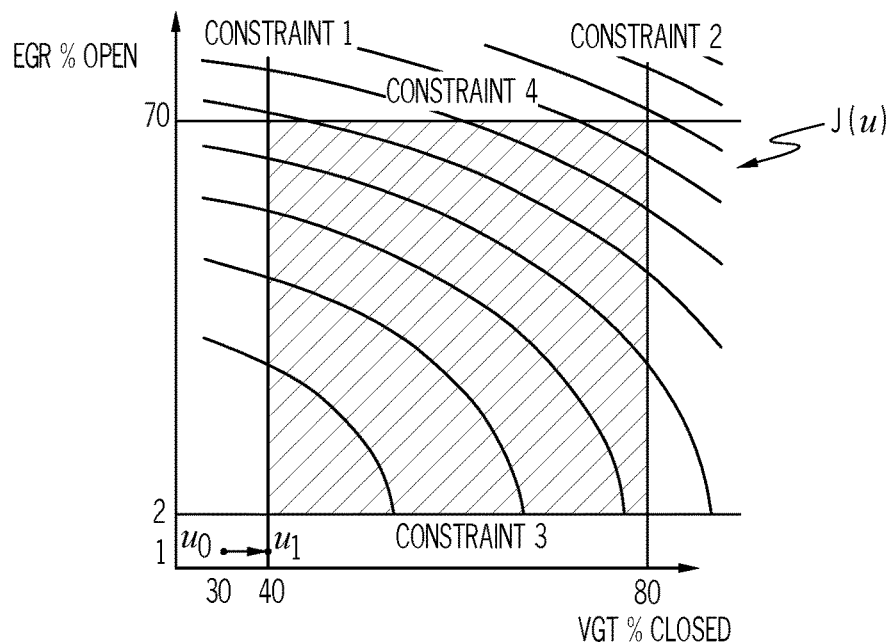
FIG. 8C is a graphical illustration of a second step in solving the primal problem of FIG. 8B, according to one or more embodiments shown and described herein.

Afterwards, the algorithm 500 proceeds to step 516 as a full primal step is taken (between points $u_0$ and $u_1$ as shown in FIG. 8C) and Constraint 1 is added before the algorithm 500 returns to step 504 to re-start the process with the newly added Constraint 1.

For example, in step 504, the algorithm 500 determines the new most violated (possible) constraint to be Constraint 3, as $\max(\mathcal{V} u_1 - \mathcal{W} > 0) =$ Constraint 3 and thus notes in step 506 that not all (possible) constraints are satisfied, moving on to step 510. In step 510, the active set list is converted to a unique identifier as follows: $S_{1,3}=\{0,1,0,1\} \Rightarrow 0101_{bin}=5_{dec}$. The dual and primal space arrays associated with the unique identifier 5 is retrieved, and, in step 512, the primal and dual step directions are calculated to determine step length to find that $t=\min(1,\infty)=1$ (primal space) $\Rightarrow$ Full Primal Step. The algorithm 500 proceeds to step 514 to update the optimization variables $u_2$ and the Lagrange multipliers $\mu_2$ as follows:

$$u_2 = -z_{5dec}\mathcal{H} + r_{5dec}^T \mathcal{W}_2 = \begin{bmatrix} 40 \\ 2 \end{bmatrix}$$

$$\mu_2 = \mu_1 + \begin{bmatrix} -r_{5dec}^T v_2 \\ 1 \end{bmatrix} t = \begin{bmatrix} 10 \\ 1 \end{bmatrix}.$$

Figure 8D:
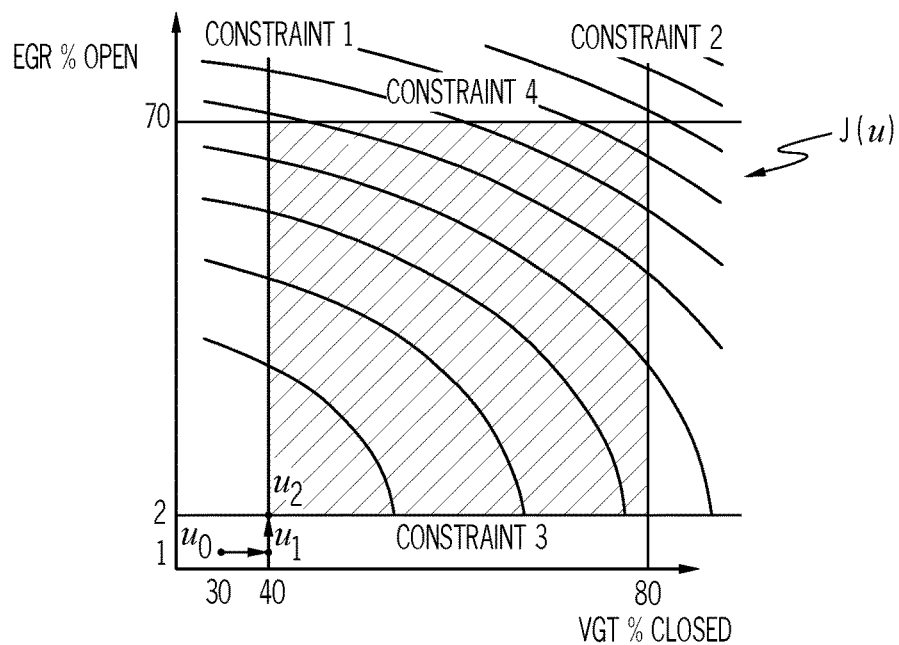
FIG. 8D is a graphical illustration of a third step in solving the primal problem of FIG. 8C, according to one or more embodiments shown and described herein.

Afterwards, the algorithm 500 proceeds to step 516 as a full primal step is taken (between points $u_1$ and $u_2$ as shown in FIG. 8D) and Constraint 3 is added before the algorithm 500 returns to step 504 to re-start the process with the newly added Constraint 3. This time, at step 504, the process determines that there is not another most violated possible constraint (as $\max(\mathcal{V} u_2 - \mathcal{W} > 0) =$ Null), and then, in step 506, all possible constraints are determined to be satisfied at point $u_2$ (such that the algorithm 500 exits at step 508 with a solution of $u_2$). As shown in FIG. 8D, point $u_2$ is the minimum point or solution at the edge of the primal feasible region that is constrained by the four constraints.

Figure 9:
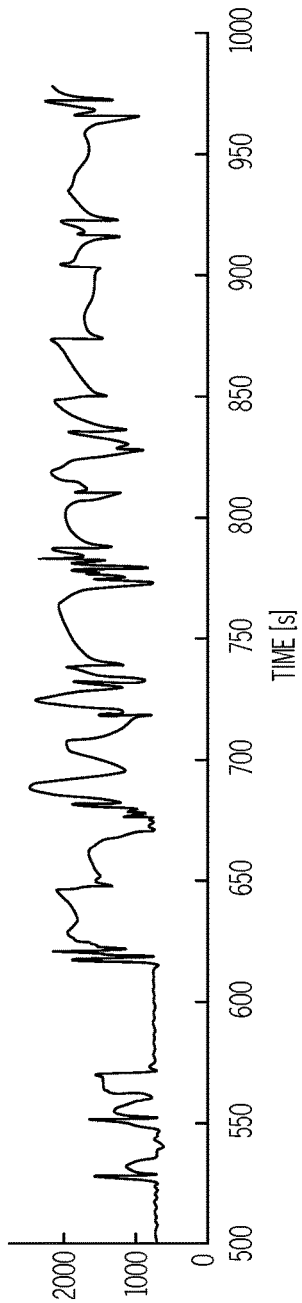
FIG. 9 illustrates a performance of engine speed controlled by a MPC controller applying the method of FIGS. 4-5, according to one or more embodiments shown and described herein.
Figure 10:
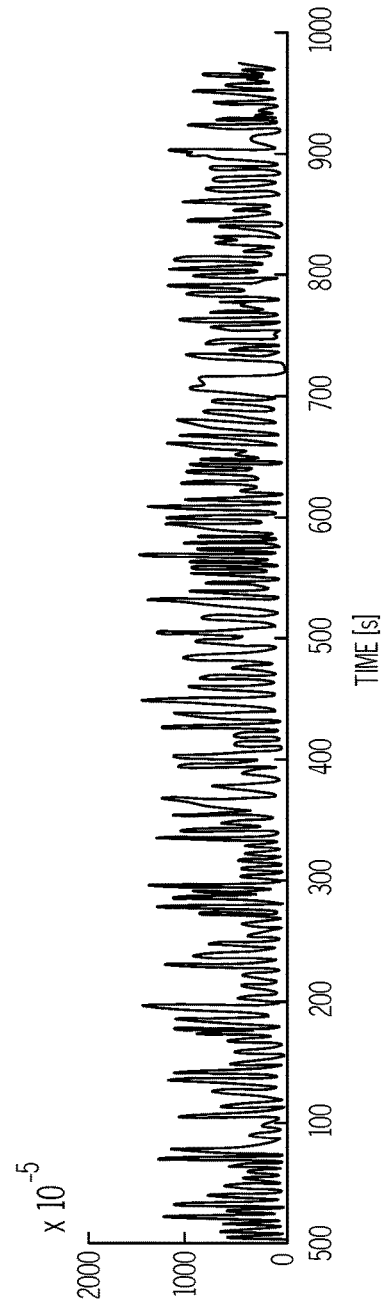
FIG. 10 illustrates a maximum error output comparison of the data of FIG. 9 against transient bench data, according to one or more embodiments shown and described herein.

Referring to FIGS. 9-10, to validate the HQPKWIK algorithm, drive cycle data for a diesel engine with a linear MPC controlling the air path (e.g., the plant) was collected as transient bench data for a WLTP cycle and was evaluated. Additionally, the HQPKWIK algorithm as described herein was used as the solver and evaluated. To validate the results, each individual problem corresponding to each time step was given to a Matlab solver (offline), and a maximum error between the HQPKWIK algorithm and transient bench data results was determined, as shown in FIG. 10.

Accumulation errors due to, for example, an iterative approach may be larger than an acceptable value of about 1e-6, indicating the errors are larger than a bound and the algorithm may not work as expected. By utilizing the HQPKWIK algorithm and a hybrid approach of utilizing iterative and direct calculations in primal space, the errors may be maintained below the acceptable value such that evaluated constraints are satisfied, as shown in FIG. 10. The results of FIG. 10 were within an indicative error range of 1.5e-5%, illustrating a successful ability to calculate the solution via the HQPKWIK algorithm correctly online.

The HQPKWIK algorithm is a hybrid range space algorithm that allows for a constrained optimization solver for production use in a plant of a diesel engine air path to be applied to a problem that changes with time (time-varying) while using an updating algorithm. The updating algorithm updates optimization variables and Lagrange multipliers of the problem based on a step length that is determined to be taken in primal and dual spaces. The HQPKWIK algorithm also successfully meets challenges such as working within the confines of a low ROM size (i.e., 4.63 KB total), being able to run on an ECU, and being able to find a correct solution accurately and a finite and quick timeframe. For example, as set forth above, FIG. 10 shows a maximum error of about 1.5e-5%, and the run example resulted in an average of about 250 FLOPS. To note, the computation time and ROM size grows as more constraints are added as HQPKWIK is an active set method, and thus the solver described herein is generally useful for solving any constrained optimization convex problem with a small number of constraints that have linear inequality.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for controlling an internal combustion engine having, within an air path of the engine, a variable geometry turbine (VGT), an exhaust gas recirculation (EGR) valve, and an EGR throttle, the method comprising:
   formulating a constrained optimization problem for a model predictive control (MPC) controller controlling the air path based on a linear model, one or more constraints, and associated pre-computed dual space and primal space matrix arrays, the linear model comprising a convex, quadratic, time-varying cost function in dual and primal space, and each array associated with a unique active set list comprising a first combination of the one or more constraints;
   solving the constrained optimization problem to determine a solution;
   updating the constrained optimization problem with an updated active set list;
   repeating the solving and formulating steps until all possible active set lists of the one or more constraints are satisfied to generate a requested optimized VGT lift and a requested optimized EGR valve flow rate, each of which meets the one or more constraints, to control the air path, wherein:
      the requested optimized VGT lift responsive to an engine intake manifold pressure is generated by controlling the VGT, and
      the requested optimized EGR valve flow rate responsive to an EGR rate is generated by controlling the EGR valve and the EGR throttle; and
   implementing the solution with respect to the air path.

2. The method of claim 1, wherein the step of solving the constrained optimization problem to determine a solution comprises:
   setting one or more optimization variables of the linear model to an unconstrained minimum;
   determining a most violated possible constraint of the one or more constraints to form an evaluative active set list;
   converting the evaluative active set list into a unique identifier;
   identifying primal and dual space arrays based on the unique identifier;
   calculating primal and dual step directions with the identified primal and dual space arrays to determine a step length based on a minimum value determined between the calculated primal and dual step directions;
   updating one or more Lagrange multipliers and the one or more optimization variables based on the determined step length until a full step length is determined to be taken;
   taking the full step length;
   adding the most violated possible constraint to a current active set list; and
   repeating the determining through adding the most violated possible constraint steps until all possible constraints are satisfied.

3. The method of claim 2, wherein the step of updating one or more Lagrange multipliers and the one or more optimization variables based on the determined step length until a full step length is determined to be taken comprises:
   determining to take one of a partial step and the full step;
   dropping the most violated possible constraint from the evaluative active set list when the partial step is taken; and
   updating the one or more Lagrange multipliers and the one or more optimization variables based on the dropped constraint.

4. The method of claim 2, wherein the step of calculating the primal and dual step directions with the identified primal and dual space arrays to determine a step length based on a minimum value between the calculated primal and dual step directions comprises:
   calculating a maximum dual step length for dual feasibility;
   calculating a maximum primal step length;
   comparing the maximum dual step length and the maximum primal step length;
   taking the full step length in primal space when the maximum primal step length is less than the maximum dual step length; and
   taking a partial step when the maximum dual step length is less than the maximum primal step length.

5. The method of claim 4, wherein taking a partial step when the maximum dual step length is less than the maximum primal step length comprises taking one of a no step and a partial primal step, wherein:
   the partial primal step is a portion of the full step length,
   the partial primal step is taken when a number of constraints is less than a maximum number of active constraints, and
   the no step is taken when the maximum number of constraints are active.

6. A system for controlling an internal combustion engine having, within an air path of the engine, a variable geometry turbine (VGT), an exhaust gas recirculation (EGR) valve, and an EGR throttle, the system comprising:
   a processor communicatively coupled to a non-transitory computer storage medium, wherein the non-transitory computer storage medium stores instructions that, when executed by the processor, cause the processor to:
      formulate a constrained optimization problem for a model predictive control (MPC) controller controlling the air path based on a linear model, one or more constraints, and associated pre-computed dual space and primal space matrix arrays, the linear model comprising a convex, quadratic, time-varying cost function in dual and primal space, and each array associated with a unique active set list comprising a first combination of the one or more constraints;

solve the constrained optimization problem to determine a solution;
update the constrained optimization problem with an updated active set list;
repeat the solving and formulating steps until all possible active set lists of the one or more constraints are satisfied to generate a requested optimized VGT lift and a requested optimized EGR valve flow rate, each of which meets the one or more constraints, to control the air path, wherein:
the requested optimized VGT lift responsive to an engine intake manifold pressure is generated by controlling the VGT, and
the requested optimized EGR valve flow rate responsive to an EGR rate is generated by controlling the EGR valve and the EGR throttle; and
implement the solution with respect to the air path.

7. The system of claim 6, wherein the instruction of solving the constrained optimization problem to determine a solution comprises instructions stored by the non-transitory computer storage medium that, when executed by the processor, cause the processor to:
set one or more optimization variables of the linear model to an unconstrained minimum;
determine a most violated possible constraint of the one or more constraints to form an evaluative active set list;
convert the evaluative active set list into a unique identifier;
identify primal and dual space arrays based on the unique identifier;
calculate primal and dual step directions with the identified primal and dual space arrays to determine a step length based on a minimum value determined between the calculated primal and dual step directions;
update one or more Lagrange multipliers and the one or more optimization variables based on the determined step length until a full step length is determined to be taken;
take the full step length;
add the most violated possible active constraint to a current active set list; and
repeat the determine through add the most violated possible constraint instructions until all possible constraints are satisfied.

8. The system of claim 7, wherein the instruction of update one or more Lagrange multipliers and the one or more optimization variables based on the determined step length until a full step length is determined to be taken comprises instructions stored by the non-ransitory computer storage medium that, when executed by the processor, cause the processor to:
determine to take one of a partial step and the full step;
drop the most violated possible constraint from the evaluative active set list when the partial step is taken; and
update the one or more Lagrange multipliers and the one or more optimization variables based on the dropped constraint.

9. The system of claim 7, wherein the instruction of calculate the primal and dual step directions with the identified primal and dual space arrays to determine a step length based on a minimum value between the calculated primal and dual step directions comprises instructions stored by the non-transitory computer storage medium that, when executed by the processor, cause the processor to:
calculating a maximum dual step length for dual feasibility;
calculating a maximum primal step length;
comparing the maximum dual step length and the maximum primal step length;
taking the full step length in primal space when the maximum primal step length is less than the maximum dual step length; and
taking a partial step when the maximum dual step length is less than the maximum primal step length.

10. The system of claim 9, wherein the instruction of take a partial step when the maximum dual step length is less than the maximum primal step length comprises an instruction to take one of a no step and a partial primal step, wherein:
the partial primal step is a portion of the full step length,
the instruction to take the primal partial step occurs when a number of active constraints is less than a maximum number of constraints, and
the instruction to take the no step occurs when the maximum number of constraints are active.

* * * * *

UNITED STATES PATENT AND TRADEMARK OFFICE
CERTIFICATE OF CORRECTION

PATENT NO.       : 10,190,522 B2
APPLICATION NO.  : 15/185664
DATED            : January 29, 2019
INVENTOR(S)      : Jason R. Rodgers, Mike Huang and Ilya Kolmanovsky It is certified that error appears in the above-identified patent and that said Letters Patent is hereby corrected as shown below:

In the Specification

In Column 7, Line 30-35, Equation 3.2, delete:

$$\min_u J(u) = \frac{1}{2} u^T Q_u + \mathcal{H}^T u$$

" s.t. $\mathcal{V}u \leq \mathcal{W}$ "

And insert:

$$\min_u J(u) = \frac{1}{2} u^T Q u + \mathcal{H}^T u$$

-- $s.t. \mathcal{V}u \leq \mathcal{W}$ --, therefor.

In Column 8, Line 20-25, Equation 3.6, delete:

" $\begin{bmatrix} u^* \\ \mu^* \end{bmatrix} = \begin{bmatrix} -H & D \\ D^T & U \end{bmatrix} \begin{bmatrix} \mathcal{H} \\ \mathcal{W} \end{bmatrix}$ "

And insert:

-- $\begin{bmatrix} u^* \\ \mu^* \end{bmatrix} = \begin{bmatrix} -H & D \\ D^T & -U \end{bmatrix} \begin{bmatrix} \mathcal{H} \\ \mathcal{W} \end{bmatrix}$ --, therefor.

In Column 9, Line 10-15, Equation 3.14A, delete:

$$u = -T^U (T^U)^T \mathcal{H} + T^C R^{-T} \mathcal{W}$$

" $\mu^* = R^{-1}(T^C)^T \mathcal{H} + R^{-1} R^{-T} \mathcal{W}$ (Equation 3.14A) "

And insert:

Signed and Sealed this
Eleventh Day of June, 2019

Andrei Iancu
*Director of the United States Patent and Trademark Office*

CERTIFICATE OF CORRECTION (continued)

U.S. Pat. No. 10,190,522 B2

Page 2 of 2

$$u^* = -T^U(T^U)^T \mathcal{H} + T^C R^{-T} W$$

$$\mu^* = R^{-1}(T^C)^T \mathcal{H} + R^{-1} R^{-T} W$$

-- (Equation 3.14A) --, therefor.

In Column 12, Line 20-25, delete:

" $\nabla J(u^*) = 0 \Rightarrow Q u^* + \mathcal{H} = 0 \Rightarrow u^* = -Q^{-1}\mathcal{H}$ "

And insert:

-- $\nabla J(u^*) = 0 \implies Q u^* + \mathcal{H} = 0 \implies u^* = -Q^{-1}\mathcal{H}$ --, therefor.

In Column 12, Line 30-35, delete:

" $\min_u J(u)[u_{01} \ u_{02}]\begin{bmatrix} 1 & 0 \\ 0 & 1 \end{bmatrix}\begin{bmatrix} u_{01} \\ u_{02} \end{bmatrix} + [1 \ 1]\begin{bmatrix} u_{01} \\ u_{02} \end{bmatrix}$ "

And insert:

-- $\min_u J(u) = \frac{1}{2}[u_{01} \ u_{02}]\begin{bmatrix} 1 & 0 \\ 0 & 1 \end{bmatrix}\begin{bmatrix} u_{01} \\ u_{02} \end{bmatrix} + [1 \ 1]\begin{bmatrix} u_{01} \\ u_{02} \end{bmatrix}$ --, therefor.

In Column 13, Line 3, after "point", insert --u*--.

In Column 17, Line 55-60, delete:

" $\mu_1 = 0 - \begin{bmatrix} -r^T_{1dec} v_1 \\ 1 \end{bmatrix} t = \begin{bmatrix} 10 \\ 0 \end{bmatrix}.$ "

And insert:

-- $\mu_1 = 0 - \begin{bmatrix} -r_{1dec} v_1 \\ 1 \end{bmatrix} t = \begin{bmatrix} 10 \\ 0 \end{bmatrix}.$ --.

In the Claims

In Column 22, Claim 8, Line 5, delete "non-ransitory" and insert --non-transitory--, therefor.